United States Patent
Sidorov et al.

(10) Patent No.: US 11,437,157 B2
(45) Date of Patent: Sep. 6, 2022

(54) DEVICE FOR CONFINING NUCLEAR REACTOR CORE MELT

(71) Applicant: JOINT-STOCK COMPANY "ATOMENERGOPROEKT", Moscow (RU)

(72) Inventors: Aleksandr Stalevich Sidorov, Moscow (RU); Tatyana Yaropolkovna Dzbanovskaya, Moscow (RU); Mihail Aleksandrovich Roshchin, Moscow (RU)

(73) Assignee: JOINT-STOCK COMPANY "ATOMENERGOPROEKT", Moscow (RU)

( * ) Notice: Subject to any disclaimer, the term of this patent is extended or adjusted under 35 U.S.C. 154(b) by 0 days.

(21) Appl. No.: 17/256,578

(22) PCT Filed: Dec. 28, 2018

(86) PCT No.: PCT/RU2018/000900
§ 371 (c)(1),
(2) Date: Dec. 28, 2020

(87) PCT Pub. No.: WO2020/067920
PCT Pub. Date: Apr. 2, 2020

(65) Prior Publication Data
US 2021/0210226 A1 Jul. 8, 2021

(30) Foreign Application Priority Data
Sep. 25, 2018 (RU) .............. RU2018133765

(51) Int. Cl.
*G21C 9/016* (2006.01)

(52) U.S. Cl.
CPC ................... *G21C 9/016* (2013.01)

(58) Field of Classification Search
CPC ................ G21C 9/016; Y02E 30/30
USPC ..................... 376/280, 461
See application file for complete search history.

(56) References Cited

U.S. PATENT DOCUMENTS

| 4,282,063 A | * | 8/1981 | Werres | G21C 5/10 376/280 |
| 2013/0170598 A1 | * | 7/2013 | Komuro | G21C 9/016 376/280 |

* cited by examiner

*Primary Examiner* — Darlene M Ritchie
(74) *Attorney, Agent, or Firm* — Brandon V. Zuniga; James R. Gourley; Carstens & Cahoon, LLP (57) ABSTRACT

A device for confining nuclear reactor core melt comprising a melt trap and provided with a multilayer vessel containment, a filler, an upper support, and a bottom support comprising a horizontal embedded plate mounted in the concrete of a reactor pit. The plate comprises radial supports, the melt trap comprising radial supports, based on the radial support of the plate. The plate radial supports and the melt trap radial supports are connected with fasteners having holes in the form of hyperbolic surfaces. The radial supports and the clamps have oval holes. The upper support comprises turnbuckles, mounted in pairs on the upper part of the melt trap body so that the longitudinal axis of each radial support of the melt trap bottom support passes in projection at an equispaced distance from the fitting location of the paired turnbuckles and connecting the melt trap body with the reactor pit vertical wall.

4 Claims, 9 Drawing Sheets

DEVICE FOR CONFINING NUCLEAR REACTOR CORE MELT

CROSS-REFERENCE TO RELATED DISCLOSURE

This application is a U.S. National Stage of International Application No. PCT/RU2018/000900, filed on Dec. 28, 2018, and published as WO 2020/067920 on Apr. 2, 2020, titled "Device for Confining Nuclear Reactor Core Melt," which claims priority to RU 2018133765 filed on Sep. 25, 2018. Each application, publication, and patent listed in this paragraph are hereby incorporated by reference in their entireties.

BACKGROUND OF THE INVENTION

The invention relates to nuclear engineering, in particular, to systems that ensure the safety of nuclear power plants (NPP), and can be used in severe accidents that lead to the core meltdown, nuclear reactor pressure vessel destruction and the release of the melt into the space of the NPP containment.

The greatest radiation hazard is represented by accidents with core meltdown, which can occur in various combinations of failures (destruction of equipment components) of active and passive safety systems and normal operation systems, or in conditions of the total power loss of the NPP, and the inability to supply power within the time period established by the NPP design to ensure the emergency core cooling.

In case of such accidents occurrence, the core meltdown—corium, melting the core internals and the reactor vessel, flows out of it and, due to the residual heat generation remaining in it, can violate the integrity of the NPP containment' the last barrier to the release of radioactive products into the environment.

To eliminate this, it is necessary to confine the corium that has flowed out of the reactor vessel and ensure its continuous cooling, until the complete crystallization of all corium components. This function is performed by the water-cooled nuclear reactor core melt cooling and confinement system, which prevents damage to the NPP containment and, thereby, protects the population and the environment from radiation exposure in severe accidents of nuclear reactors.

SUMMARY OF THE INVENTION

The device (1) for confining nuclear reactor core melt comprising a melt trap, which is installed in the reactor vessel bottom and provided with a cooled containment as the multilayer vessel, a filler for the melt dilution, placed in the specified multi-layered vessel, the bottom support consisting of horizontal, sectional, solid or split, embedded plate mounted on a multilayer vessel in the concrete of the reactor pit, a cylindrical vertical tube connecting the body of the melt trap with a bond plate by means of clamps, and fasteners, is already known.

The drawback of the device is low reliability, due to the fact that when a peak of non-axisymmetric melt discharge into the melt trap body, the melt trap can shift under the influence of shock loads and tip over the vertical wall of the reactor pit, which will lead to the release of the melt outside the melt trap.

The melt confining system (2), mounted in a reactor pit consisting of a support surface and side walls, comprising a vessel for the melt, and upper supports mounted on the protrusions of the side walls of the reactor pit, is already known.

The drawback of the system is low reliability, due to the fact that when a peak of the melt discharge into the melt trap body, the upper supports are deformed, that leads to the melt trap fall on the lower surface of the reactor pit and its overturning on the vertical wall of the reactor pit, which will lead to the melt release outside the melt trap.

The technical result of the claimed invention is to increase the reliability of the device for confining nuclear reactor core melt.

The objects to be solved by the claimed invention are to eliminate the overturning of the melt trap of the device for confining nuclear reactor core melt when exposed to non-axisymmetric shock loads and the melt releases out of the body.

The objects are solved due to the fact that the device for confining nuclear reactor core melt comprising a melt trap, which is installed in the reactor vessel bottom and provided with a cooled containment as the multilayer vessel, a filler for the melt dilution, placed in the specified multi-layered vessel, the upper support, the bottom support consisting of horizontal, sectional, solid or split, embedded plate mounted on a multilayer vessel in the concrete of the reactor pit, according to the invention, the horizontal sectional, solid or split embedded plate comprises radial supports, the melt trap comprising radial supports, based on the radial support of the horizontal sectional, solid or split embedded plate, the radial supports of the horizontal radial section, solid or split embedded plate and the radial supports of the melt trap body are connected through fasteners, while the radial supports and the clamps have oval holes, the upper support comprises turnbuckles, mounted in pairs on the upper part of the melt trap body so that the longitudinal axis of each radial support of the melt trap bottom support passes in projection at an equispaced distance from the fitting location of the paired turnbuckles installed tangentially to the melt trap body and connecting the melt trap body with the reactor pit vertical wall, while the fasteners have holes made in the form of hyperbolic surfaces.

One characteristic feature of the claimed invention is the upper support, which consists of paired turnbuckles that are located on the melt trap outer body such a way that the longitudinal axis of the radial support passes in the projection at an equispaced distance from the places where the turnbuckles are fitted.

Another characteristic feature is that the turnbuckles are mounted tangent to the melt trap body.

One more characteristic feature of the claimed invention are fasteners with holes made in the form of hyperbolic surfaces.

This type of turnbuckles arrangement provides:

free thermal radial expansions of the melt trap body in the turnbuckles plane (in the horizontal plane) due to the tangent release of the turnbuckles in the melt trap body lugs, in which any radial expansions of the melt trap body lead only to a change in the plane angle of the turnbuckle tangent position relative to the melt trap body generating line. Thus, the risk of turnbuckles formability with loss of their performance and the risk of cracking or destruction of the melt trap body is eliminated;

non-exceedance of the radial pullout strength effect on embedded parts in the concrete reactor pit (controlled loading) due to the distribution of the radial shock load between all the turnbuckles. In this case, a part of the turnbuckles will work for compression, part—for stretching in the turnbuckles plane. In this case, the horizontal shock load leads to planar vibrations of the melt trap body flange, in which all turnbuckles work alternately for tension and compression in the area of elastic deformations of the turnbuckles, up to the attenuation of the planar vibrations;

reducing the non-axisymmetric impact on the bottom support of the melt trap body with non-axisymmetric axial (vertical) shock loading of the body in the flange area due to the distribution of the axial shock load between all the turnbuckles. In this case, those turnbuckles in the area of which the effect of a non-axisymmetric axial shock load has appeared do not provide mechanical resistance to the shape change of the melt trap body flange. Thus, the melt trap body flange, in the area of which the axial impact has appeared, redistributes the shock load along its perimeter, redistributing the axial impact into two additional components with the formation of both azimuth (along the perimeter of the body) and radial (planar) vibrations. A part of the impact in the form of axial elastic vibrations of the melt trap body does not affect the turnbuckles, azimuth vibrations are damped by elastic deformations of the turnbuckles, and radial vibrations propagating in the plane of the turnbuckles are alternately damped by them, as when a radial shock load is damped;

non-exceedance of the effect of azimuth pullout strength on embedded parts in the concrete reactor pit during seismic effects on the melt trap body (damping torsional vibrations of the body flange) due to the alternate operation of the turnbuckles for tension and compression under the influence of flat torsional vibrations from the side of the flange of the melt trap body flange. The vibrations damping is provided by absorbing the energy of the turnbuckles elastic deformations, up to the attenuation of torsional vibrations;

maintaining the melt trap body flange integrity, embedded parts of the reactor pit and the upper support during axial thermal expansion of the melt trap body by ensuring the turnability of the turnbuckles fork-plugs in the axial (vertical) plane, which is provided by the hyperbolic surface of the turnbuckles mounting holes in the fork-plugs of the melt trap body and in the fork-plugs of vertical embedded plates installed in the reactor pit. Execution of the hyperbolic surface of the holes in the fasteners may be performed both on the melt trap body and on embedded plates.

DETAILED DESCRIPTION

The claimed invention is functioning as follows.

Figure 1:
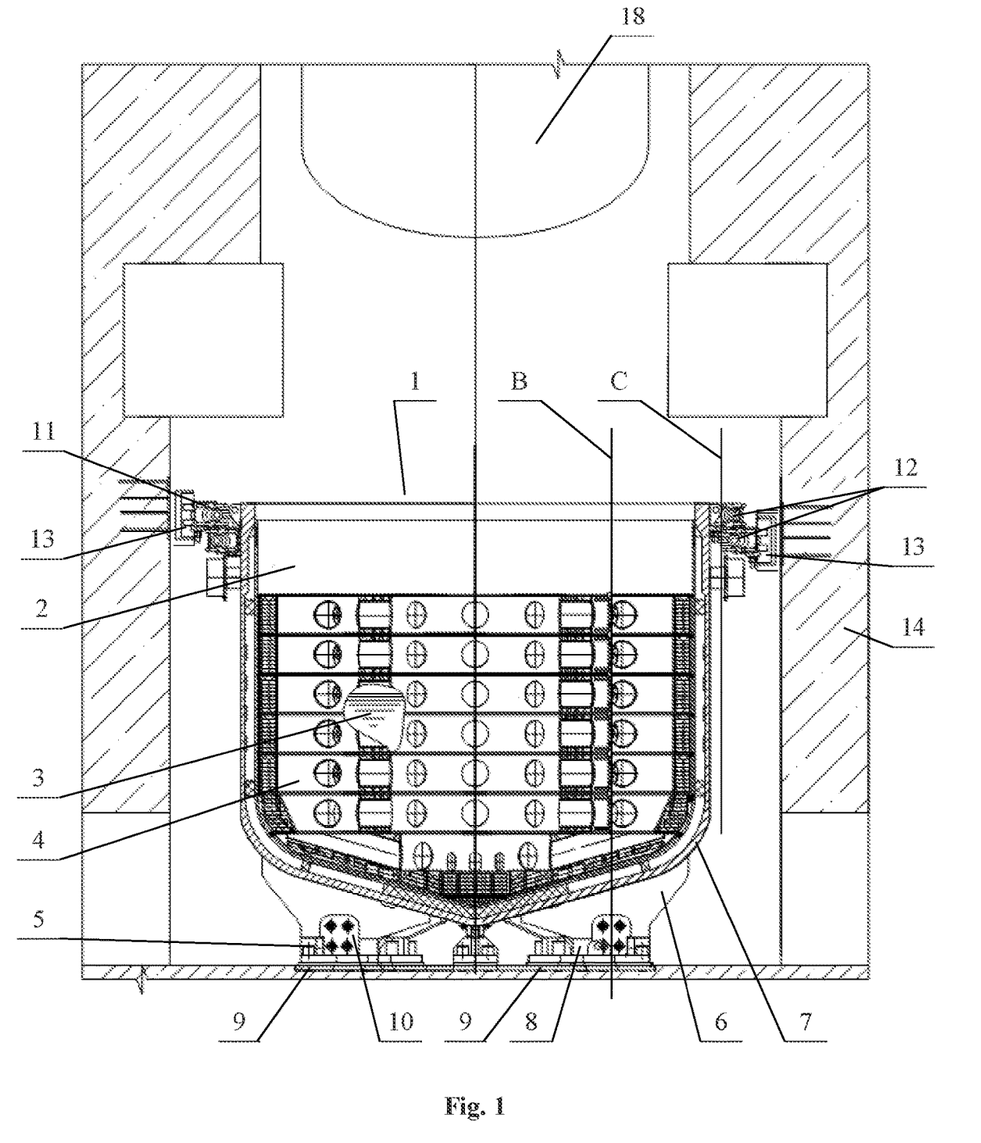
FIG. 1 shows a device for confining nuclear reactor core melt executed in accordance with the claimed invention.
Figure 4A:
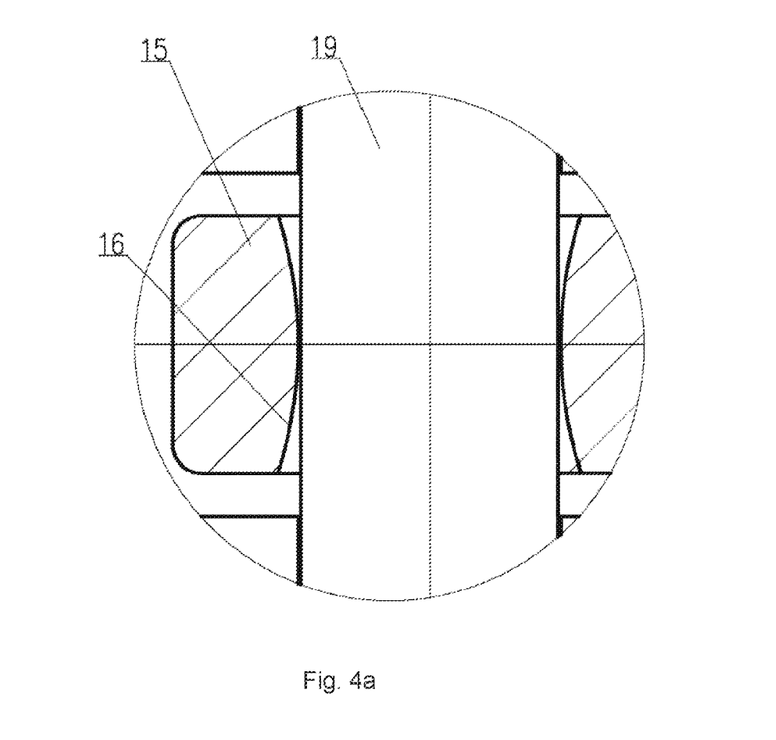
Figure 4B:
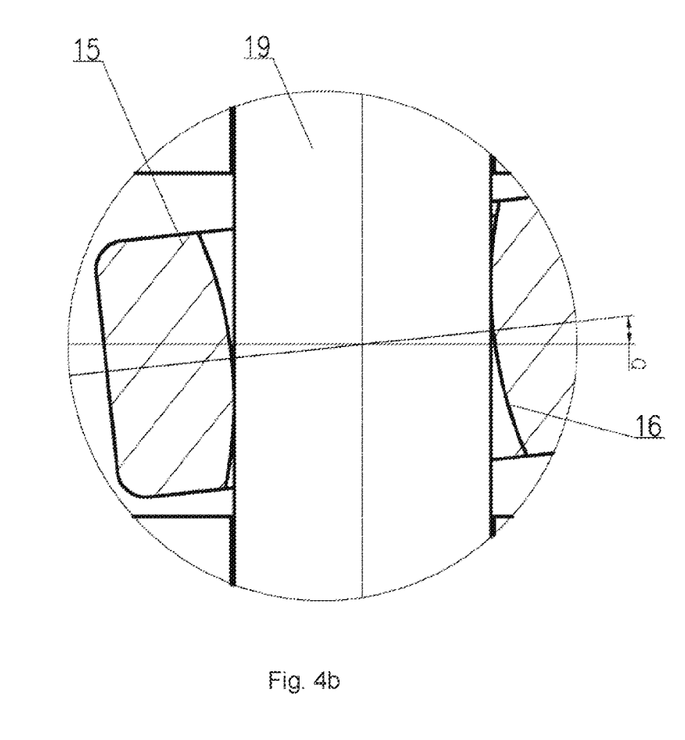

FIG. 1 shows the device (1) for confining nuclear reactor core melt containing melt (3) trap (2), which is installed in the reactor vessel bottom (18) and provided with a cooled containment as the multilayer vessel, a filler (4) for the melt (3) dilution, placed in the specified multi-layered vessel, the bottom support (5) consisting of the radial supports (6) positioned on the external side of the melt (3) trap (2) bottom part body (7) and based on the radial supports (8) of the horizontal embedded plate (9) which are connected with fasteners (10), the upper support (11), that comprises turnbuckles (12), mounted in pairs on the upper part of the melt (3) trap (2) body (7) so that the longitudinal axis (B) of each radial support (6) of the melt (3) trap (2) bottom support (5) passes in projection at an equispaced distance from the fitting location of the paired turnbuckles installed (13) tangentially to the melt (3) trap (2) body (7) and connecting the melt (3) trap (2) body (7) with the reactor pit vertical wall (14); the cross section (C) of the turnbuckle attachment to the trap body, which is also illustrated in FIG. 4.

Figure 1A:
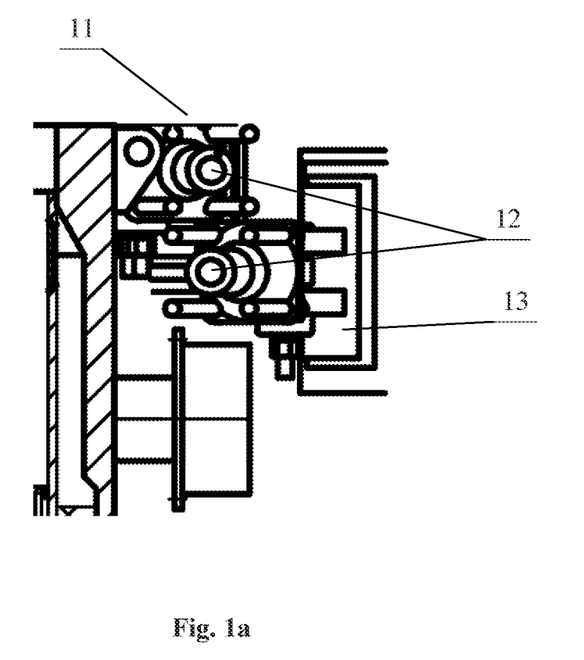
FIG. 1a shows an enlarged view of the upper support.
Figure 2:
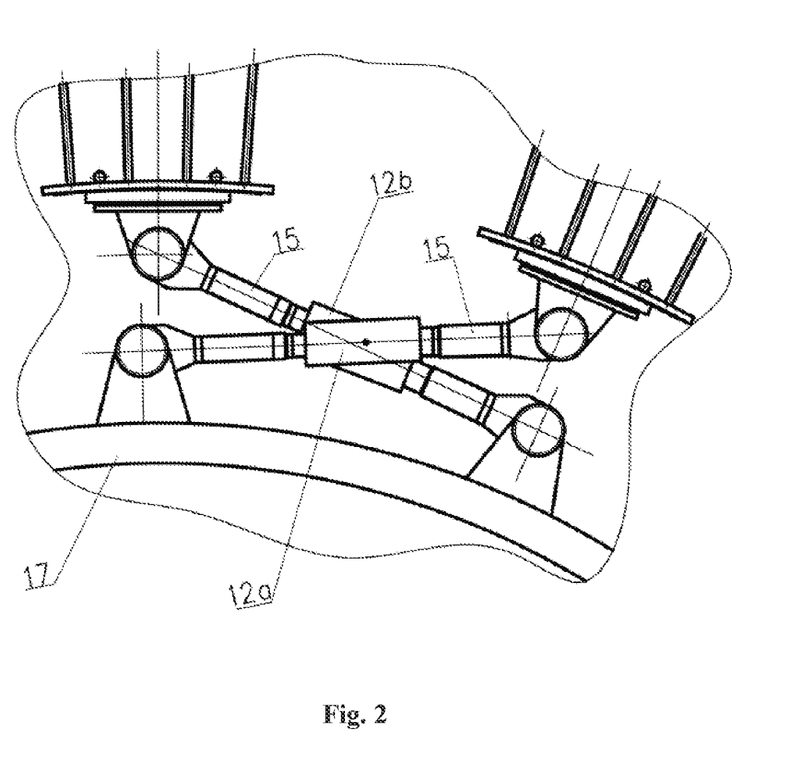
FIG. 2 depicts a schematic illustrative example of a pair of turnbuckles mounted on a flange at the upper part of the melt trap body.

FIG. 1a shows an enlarged view of the upper support (11) with turnbuckles (12), and the fitting location of the paired turnbuckles (13), with additional details being illustrated in FIG. 2.

Figure 1B:
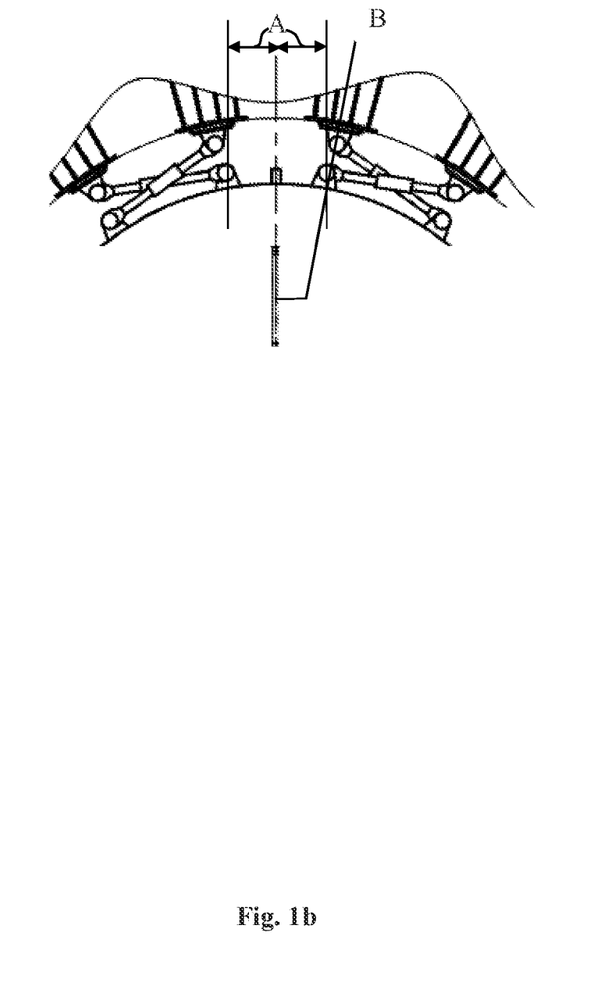
FIG. 1b depicts a schematic illustrative example of a top view of portions of the upper support and the bottom support and illustrates how the installation sites of paired turnbuckles can be equidistant from the longitudinal axis of a lower radial support of the bottom support

FIG. 1b shows a top view of a portion of the upper support and bottom support and illustrates how the installation sites of paired turnbuckles can be equidistant (e.g., a distance (A)) from the longitudinal axis (B) of a lower radial support of the bottom support. As illustrated, the longitudinal axis (B) of the lower radial support is perpendicular to the sheet and directed upwards as also illustrated in FIG. 1.

Figure 1C:
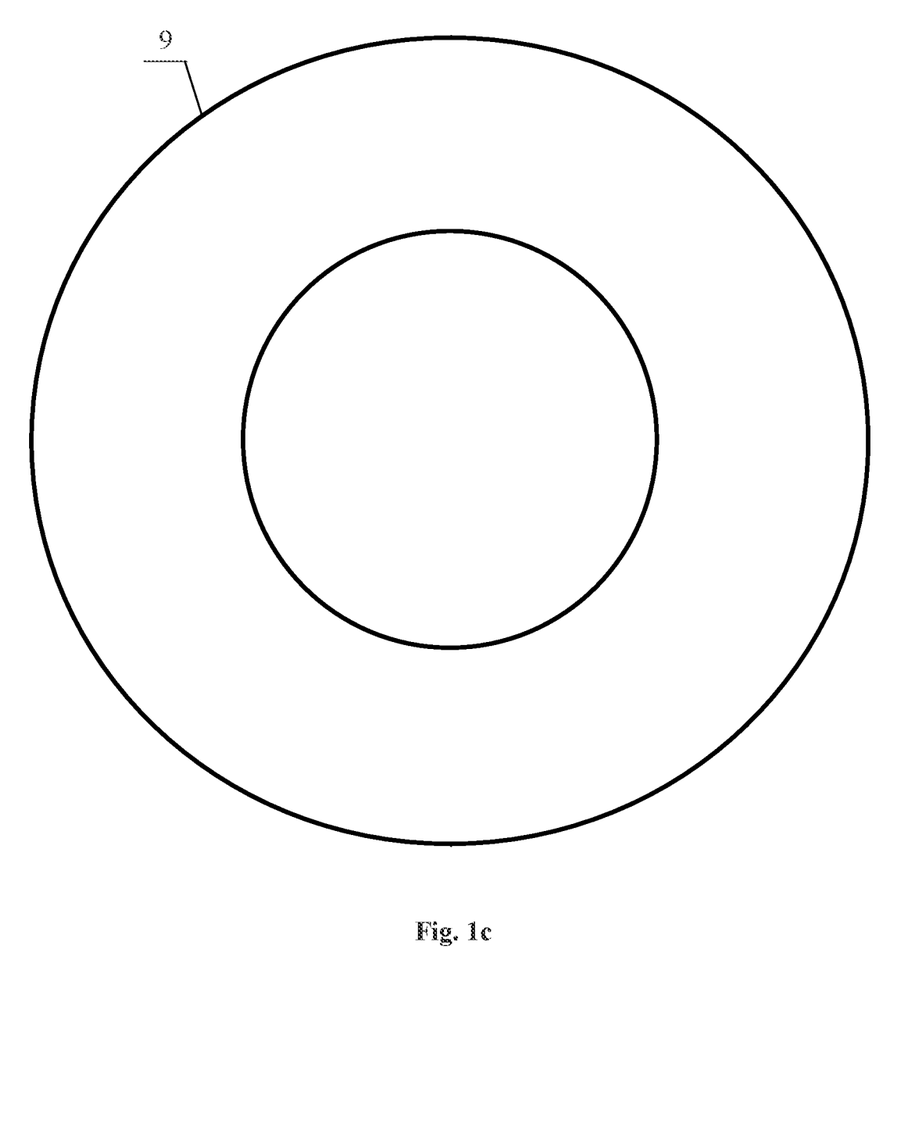
FIG. 1c depicts a schematic illustrative example of a solid embedded plate of the bottom support that is made of a single piece.

FIG. 1c shows an example of a solid embedded plate of the bottom support.

Figure 1D:
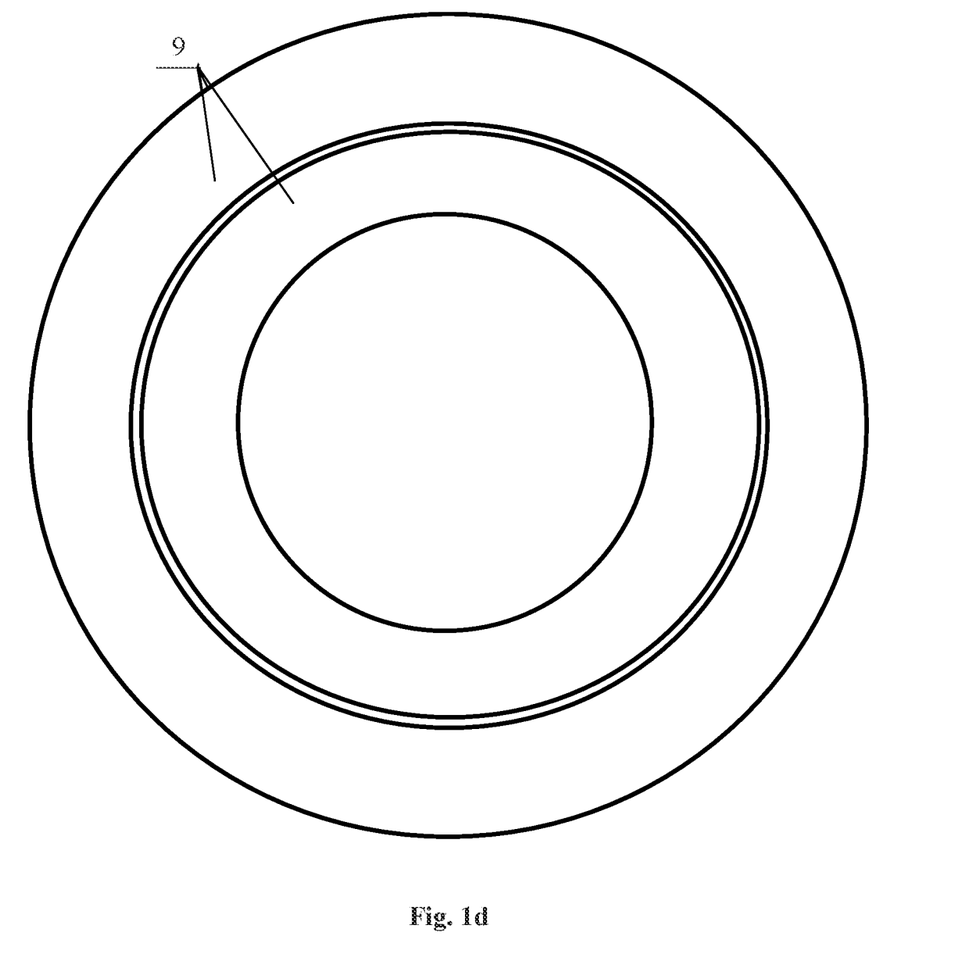
FIG. 1d depicts a schematic illustrative example of a split embedded plate of the bottom support that is divided, for example, into two concentric parts.

FIG. 1d shows an example of a split embedded plate of the bottom support that is divided, for example, into two concentric parts.

Figure 1E:
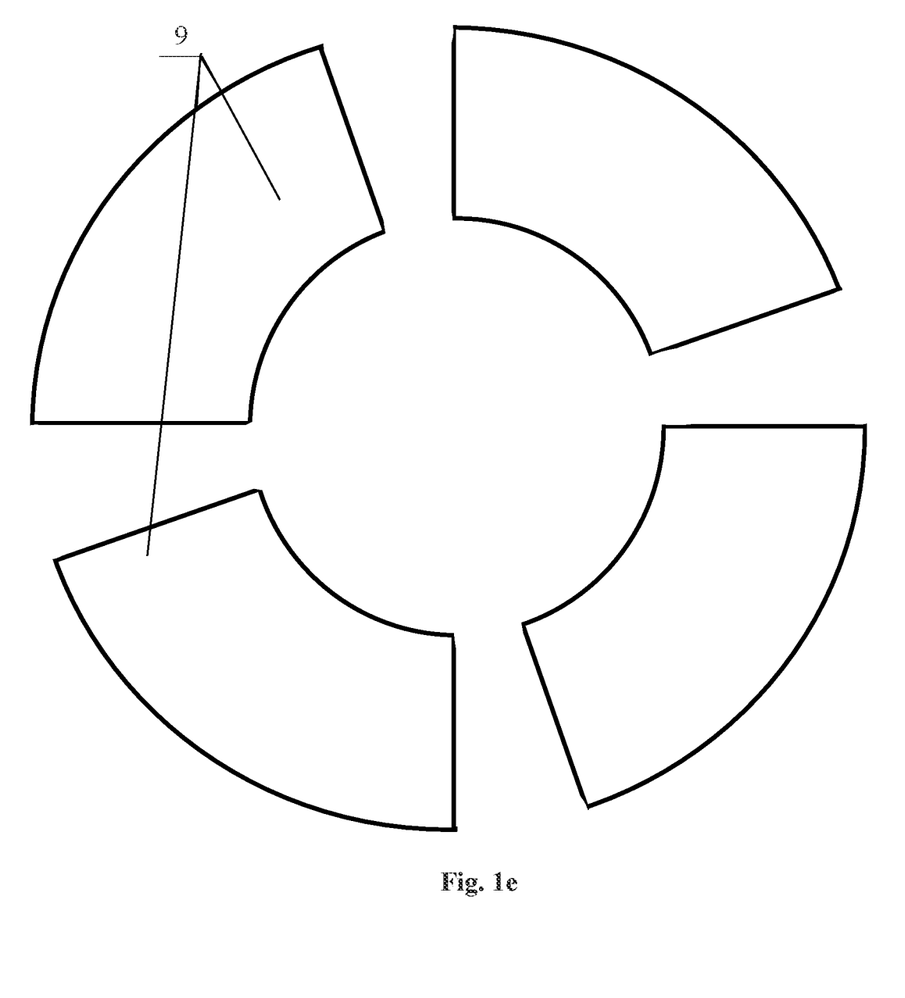
FIG. 1e depicts a schematic illustrative example of a sectional embedded plate of the bottom support, which can be, for example, in the form of 4 sections.

FIG. 1e shows an example of a sectional embedded plate of the bottom support, which can be, for example, in the form of 4 sections.

FIG. 2 shows an example of a pair of turnbuckles (12) mounted on a flange (17) at the upper part of the melt trap (2) body.

Figure 3:
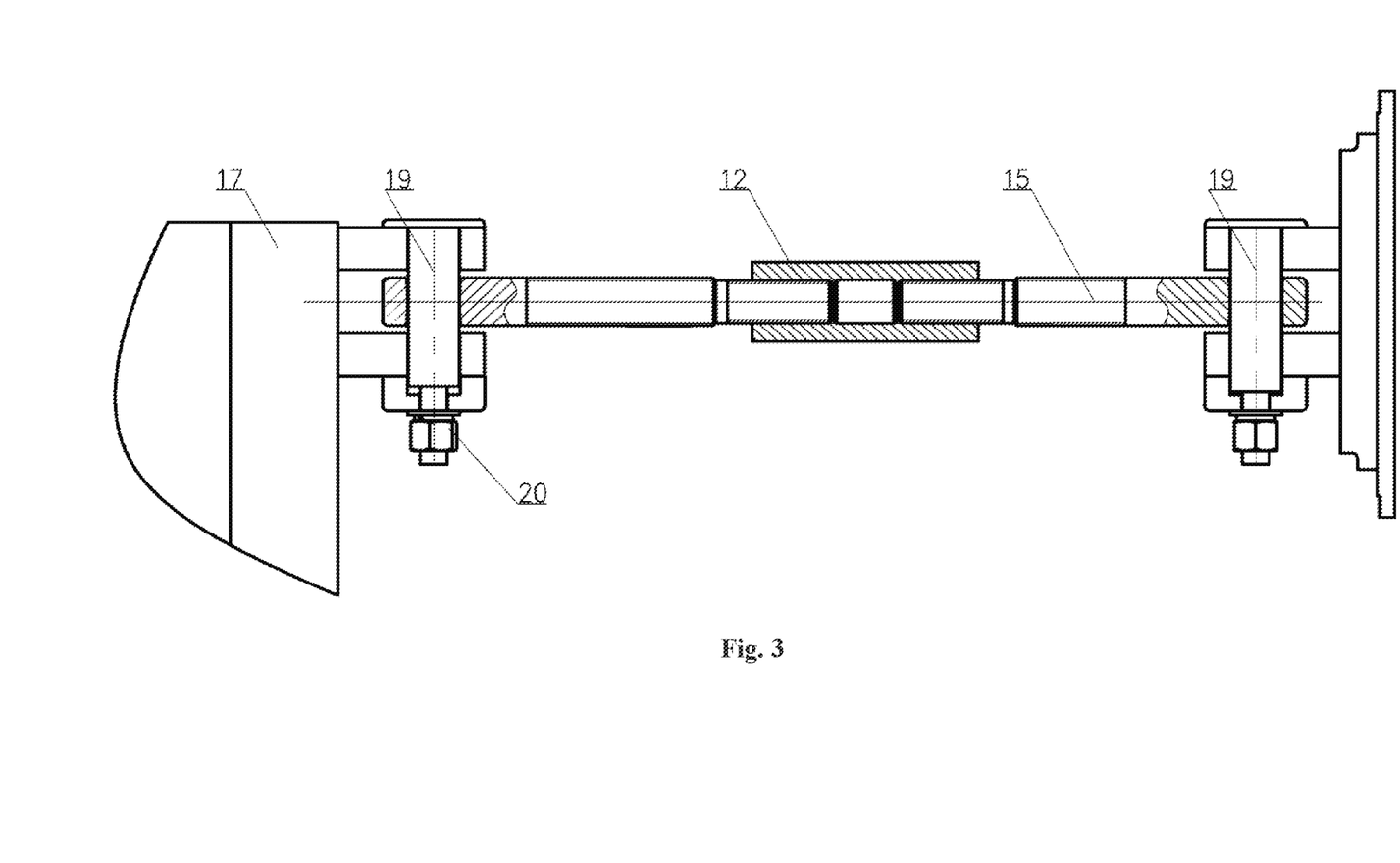
FIGS. 3, 4a and 4b depicts a schematic illustrative example of pull rods of the turnbuckles having holes made in the form of hyperbolic surfaces, in which fasteners of the upper support are installed.

As shown on FIG. 3, FIG. 4a, and FIG. 4b the pull rods (15) of the turnbuckles (12) have holes (16) made in the form of hyperbolic surfaces, in which the axes (19) of the fasteners (20) of the upper support (11) are installed. When changing the position of the pull rods (15) of the turnbuckles (12) connecting the body (7) to the fitting locations (13) of the paired turnbuckles (12), the pull rods (15) rotate in the axial plane passing through the axis of each turnbuckles (12).

At the moment of the reactor vessel destruction, the core melt (2) under the action of hydrostatic and overpressure begins to flow into the double body (7) of the melt trap and comes into contact with the filler (4).

In the case of a non-axisymmetric peak of the melt (2) discharge, for example, 60 tons of superheated steel for 30 seconds, the main shock load falls on the side inner wall of the body (7) of the melt (3) trap (2).

As shown on FIG. 2, in this case, those turnbuckles (12a), in the area of which the effect of a non-axisymmetric axial shock load has appeared, do not have mechanical resistance to the shape of the flange (17) of the body (7). Thus, the body flange (17), in the area of which the axial impact has appeared, redistributes the shock load along its perimeter, redistributing the axial impact into two additional components with the formation of both azimuth (along the perimeter of the body (7)) and radial (planar) vibrations. A part of the impact in the form of axial elastic vibrations of the body (7) does not affect the turnbuckles (12a), azimuth vibrations are damped by elastic deformations of the turnbuckles (12b), and radial vibrations propagating in the plane of the turnbuckles (12a) are alternately damped by them, as when a radial shock load is damped.

The radial shock load is damped as follows. A part of the turnbuckles (12a) will work for compression, part—for stretching in the turnbuckles (12) plane. In this case, the horizontal shock load leads to planar vibrations of the body (7) flange (17), in which all turnbuckles (12) work alternately for tension and compression in the area of elastic deformations of the turnbuckles (12), up to the attenuation of the planar vibrations.

The use of the upper support together with the bottom support in the device for confining nuclear reactor core melt made it possible to completely eliminate the probability of the melt release outside the melt trap body by excluding its overturning, even when exposed to a non-axisymmetric shock load.

INFORMATION SOURCE

1. Russian Patent No. 2398294, IPC G21C 9/00, priority dated Apr. 15, 2009.
2. Japanese Patent JP2010271261, IPCG21C9/00, priority dated May 25, 2009.

What is claimed is:

1. A device for confining the melt of a nuclear reactor core, comprising:
   a melt trap body configured to be mounted below a bottom of a reactor vessel, the melt trap comprising a cooled multilayered housing;
   a filler for diluting melt, the filler being arranged in the multilayered housing;
   an upper melt trap support; and
   a lower melt trap support comprising a horizontal embedded plate mounted under the multilayered housing and configured to be mounted in concrete of a reactor shaft;
   wherein the embedded plate comprises lower radial supports and the multilayered housing comprises upper radial supports resting on the lower radial supports of the embedded plate;
   wherein the lower radial supports and the upper radial supports are connected by means of fasteners and comprise oval holes, and the fasteners have openings in the form of hyperbolic surfaces; and
   wherein the upper melt trap support comprises a plurality of turnbuckles mounted in pairs on an upper part of the multilayered housing such that, from a top view of the melt trap body, each lower radial support extends in projection equidistantly from file attachment points of corresponding paired turnbuckles of the plurality of turnbuckles, the corresponding paired turnbuckles mounted tangentially to the melt trap body and configured to connect the melt trap body to a vertical wall of the reactor shaft.

2. The device of claim 1, the embedded plate being a sectional embedded plate.

3. The device of claim 1, the embedded plate being a solid embedded plate.

4. The device of claim 1, the embedded plate being an embedded plate made of separate pieces.

* * * * *

UNITED STATES PATENT AND TRADEMARK OFFICE
CERTIFICATE OF CORRECTION

| | |
|---|---|
| PATENT NO. | : 11,437,157 B2 |
| APPLICATION NO. | : 17/256578 |
| DATED | : September 6, 2022 |
| INVENTOR(S) | : Aleksandr Stalevich Sidorov et al. |

It is certified that error appears in the above-identified patent and that said Letters Patent is hereby corrected as shown below:

In the Claims

In Column 6, Line 25, replace "from file attachment points" with --from attachment points--.

Signed and Sealed this
Twenty-fourth Day of October, 2023

Katherine Kelly Vidal
*Director of the United States Patent and Trademark Office*